United States Patent
Morise

(10) Patent No.: US 6,354,526 B1
(45) Date of Patent: Mar. 12, 2002

(54) SINGLE BEARING FISHING REEL AND SOUNDING MECHANISM

(75) Inventor: Taisei Morise, Sakai (JP)

(73) Assignee: Shimano Inc., Osaka (JP)

(*) Notice: Subject to any disclaimer, the term of this patent is extended or adjusted under 35 U.S.C. 154(b) by 0 days.

(21) Appl. No.: 09/516,185

(22) Filed: Mar. 1, 2000

(30) Foreign Application Priority Data

Mar. 12, 1999 (JP) .......................................... 11-066030
Mar. 26, 1999 (JP) .......................................... 11-083351
Apr. 27, 1999 (JP) .......................................... 11-120509

(51) Int. Cl.[7] ..................... A01K 89/033; A01K 89/016
(52) U.S. Cl. ....................... 242/295; 242/306; 242/318; 242/322
(58) Field of Search ................................ 242/305, 306, 242/307, 317, 318, 296, 303, 322, 295

(56) References Cited

U.S. PATENT DOCUMENTS

| 1,612,177 A | 12/1926 | Catucci | |
|---|---|---|---|
| 1,612,178 A | 12/1926 | Catucci | |
| 1,637,334 A | 8/1927 | Catucci | |
| 2,059,765 A | * 11/1936 | Adams | ..................... 242/307 |
| 2,116,581 A | 5/1938 | Moor | |
| 2,993,660 A | * 7/1961 | Parks | ..................... 242/307 |
| 3,506,214 A | * 4/1970 | Laszlo | ..................... 242/318 |
| 3,574,339 A | 4/1971 | Sarah | |
| 3,993,267 A | * 11/1976 | Murvall | ..................... 242/307 |
| 4,515,325 A | * 5/1985 | Ito | ..................... 242/318 |
| 4,733,830 A | * 3/1988 | Hollander | ..................... 242/322 |
| 5,556,050 A | 9/1996 | Baisch et al. | |
| 5,590,847 A | * 1/1997 | Ament | ..................... 242/317 |
| 5,755,391 A | * 5/1998 | Sacconi | ..................... 242/317 |
| 6,155,508 A | * 12/2000 | Lapage | ..................... 242/322 |

FOREIGN PATENT DOCUMENTS

DE  29801217 U1  3/1998

* cited by examiner

Primary Examiner—Katherine A. Matecki
(74) Attorney, Agent, or Firm—Shinjyu Global IP Counselors, LLP

(57) ABSTRACT

A fishing reel includes a spool that includes a cylindrical spool drum 15, a disk-shaped inner flange 16 mounted on or alternatively formed at one end of the spool drum 15, and outer flange 17 mounted by four bolts 17a to the spool drum 15. Inner flange 16 is formed such that it opposes the side plate of the reel body, and male screw part 16a is provided protruding at the center part thereof. The outer flange 17 is formed by press forming an aluminum alloy, for example.

9 Claims, 8 Drawing Sheets

SINGLE BEARING FISHING REEL AND SOUNDING MECHANISM

BACKGROUND OF THE INVENTION

A. Field Of The Invention

The present invention relates to features of a single bearing fishing reel such as a sounding mechanism within the single bearing fishing reel, where the sounding mechanism is arranged between a first member and a second member of the fishing reel that rotate relative to one another, and the sounding mechanism sounds in response to relative rotation of between the first and second members.

B. Description Of The Related Art

A single bearing reel is generally provided with a reel body mounted to a fishing rod; a spool shaft supported cantilevered to the reel body; a spool rotatably mounted about the spool shaft; and a drag mechanism that brakes the spool in one direction.

The spool of this type of single bearing reel has a spool drum mounted to the spool shaft and whereon fishing line is wound about the outer circumference; a disk-shaped inner flange mounted on the reel body side of the spool drum; and a disk-shaped outer flange mounted to the other end of the spool drum and having a handle on one side surface. Such a spool is formed as one body by, for example, an aluminum alloy or magnesium alloy.

In the spool of a prior art single bearing reel, the inner flange and outer flange are formed as one body with the spool drum. Consequently, if the spool is formed by die casting, for example, the flow of melt is poor when feeding the melt into the mold, and it is difficult to form the desired shape. Accordingly, the reworking required to form a spool with high precision is troublesome.

In addition, since a spool is formed from a single material, it is difficult to find a material that can simultaneously reduce costs, reduce weight and improve aesthetic appearance.

Sounding mechanisms in fishing reels are also known. One such sounding mechanism is provided between two members of the fishing reel that rotate relative to one another, and generates a clicking sound in response to the relative rotation of the two members. The sounding mechanism is mounted to a drag mechanism or drag operation knob of a fishing reel in a spinning reel, dual bearing reel or a single bearing reel. By mounting the sounding mechanism in the drag mechanism, the bite of a fish on a fishing lines cause drag and the sound indicating the presence of a fish can be recognized. In addition, mounting the sounding mechanism to the drag operation knob may improves the operational characteristics.

Among sounding mechanisms of this type, a pin system sounding mechanism is known. A pin system sounding mechanism generally has: a first member that moves relative to a second member where the first and second members oppose one another; a mounting hole formed in the second member at a position opposing the first member; a sound producing pin retained in the mounting hole but able to undergo reciprocating movement; and a coil spring that urges the sound producing pin toward recesses formed in the first member. The mounting hole is a cylindrical hole made in the second member with a diameter larger than the maximum outer diameter of the sound producing pin. The sound producing pin has: a convex head with a smooth tip; and a shaft formed connected to the head and having a diameter smaller than the head. The coil spring is arranged in a compressed state on the outer circumference side of the shaft portion, and urges the sound producing pin toward the recessest by contacting the back surface of the head.

If the two members rotate relative to one another in pin system sounding mechanisms of this type, the sound producing pin retained in the mounting hole is urged by the coil spring and repetitively collides with the recesses; as a result, a clicking sound is generated. Problems that the Invention Is to Solve In the above mentioned prior art pin system sounding mechanisms, if the spacing between the first and second members varies due to the setting state of the drag force, as in a drag mechanism, the volume and quality of the clicking sound tends to vary with the fluctuation of that spacing. This variation is considered to be linked to the ease with which the sound producing pin moves. In other words, if the spacing between the two members is narrow, the amount of protrusion of the sound producing pin is small and, consequently, it is difficult for the sound producing pin to move, the sound producing pin scarcely vibrates, the volume diminishes and articulation of the sound is poor. In addition, if the spacing is conversely widened, the amount of protrusion of the sound producing pin increases, the sound producing pin moves more easily, the sound producing pin vibrates strongly, the volume increases, and a well-articulated click sound results.

SUMMARY OF THE INVENTION

One object of the present invention is to make the spool of a single bearing reel easy to form, and also to reduce costs, reduce weight and improve aesthetic appearance.

Another object of the present invention is to control the variation in the quality and volume of the clicking sound in a pin system sounding mechanism, even if the spacing between the two members fluctuates.

In accordance with one aspect of the present invention, a single bearing reel includes a reel body mountable to a fishing rod. A spool shaft has a first end supported on the reel body in a cantilever manner. A spool includes a spool drum rotatably and removably mounted to the spool shaft. The drum is configured to receive fishing line wound around the outer circumference thereof. An inner flange is provided on a first side of the spool drum and an outer flange is provided on a second side of the spool drum. The outer flange is formed from a first material and at least one of the spool drum and the inner flange is made from a second material different from the first material.

Preferably, the spool drum and the inner flange are formed unitarily as a single member. A handle is mounted on an outer surface of the outer flange and an inner surface of the outer flange is mounted to the spool drum.

Preferably, the spool drum and the inner flange are made of resin, and the outer flange is made of metal.

Preferably, the outer flange metal is press formed.

Alternatively, the spool drum and the inner flange are formed as separate members. The inner flange and the spool drum are each formed with interconnecting screw-type threads.

Preferably, a handle is mounted on an outer surface of the outer flange and an inner surface of the outer flange is mounted to the spool drum.

Preferably, the interconnecting screw-type threads are such that one end of the spool drum is formed with a threaded screw hole, and the inner flange is formed with a hub having external threads engageable with the threaded screw hole.

Preferably, the outer flange is formed with at least one through hole and the spool drum is formed with at least one second threaded screw hole, and a bolt extends through the through hole and threads into the second screw hole.

Preferably, at least one of the inner flange and the outer flange is made of metal Preferably, the outer flange is made of press formed metal.

Preferably, the inner flange is made of synthetic resin.

Preferably, the single bearing reel further includes a sound generating mechanism disposed between the inner flange and a stationary portion of the reel body.

Preferably, the sound generating mechanism includes a sound producing pin supported within the reel body and an annular member supported within the spool such that the annular member rotates only in response to rotation of the spool in a first rotation direction. The sound producing pin contacts the annular member such that in response to rotation of the annular member the sound producing pin and the annular member produce a sound.

Preferably, the single bearing reel further includes a drag mechanism and the pin is disposed within the drag mechanism.

In accordance with another aspect of the present invention, a fishing reel sounding mechanism is disposed within a fishing reel. The fishing reel has a rotatable first member supported on a spool of the fishing reel and the fishing reel has a non-rotating second member supported on the fishing reel. The second member is selectively moveable in an axial direction with respect to the first member such that the second member is moveable to a first position having a maximum separation from the first member. Further, the second member is moveable to a second position having a minimum separation from the first member. The fishing reel sounding mechanism includes an annular surface on the first member formed with a plurality of circumferentially spaced apart sound producing recesses. A mounting hole is formed in the second member facing the annular surface. A sound producing pin has: a head having a tip that has a smooth convex shape, the head being positioned to collide with the sound producing recesses in response to rotation of the first member; a guide portion connected to the head, the guide portion being formed with a diameter larger than a diameter of the head, the guide portion extending completely into the mounting hole; and a shaft connected to the guide portion and formed with a diameter smaller than the guide portion, the shaft extending into the mounting hole for reciprocating movement along a length of the mounting hole. An urging member is disposed within the mounting hole around an outer circumferential surface of the shaft urging the sound producing pin toward the sound producing recesses. The guide portion extends into the mounting hole an axial depth, the axial depth being greater than an axial length of the guide portion with the head of the sound producing pin in contact with one of the sound producing recesses and the second member is in the first position.

Preferably, the guide portion has a cylindrical shape, the head is formed with a tapering portion that extends from the guide portion to the tip.

Preferably, the tapering portion at least partially extends out of the mounting hole with the head contacting the annular surface.

Alternatively, the guide portion has a cylindric shape and the head extends from the guide portion, the head having a generally cylindric shape having a diameter smaller than the guide portion.

Preferably, the tip of the head is semispherical.

Preferably, a maximum outer diameter of the guide portion is in a range of 85% to 98% of an inner diameter of the mounting hole Preferably, a length in the axial direction of the guide portion is in a range of 5% to 20% of the total length of the sound producing pin.

Since the spool of this single bearing reel can be formed as separate bodies as a plurality of members, it can be formed more easily than a spool formed as a single body.

In addition, since the spool can be formed by different materials, the aesthetic appearance can be improved by, for example, making the spool on the side is externally visible out of a metal having a high-grade feel. On the other hand, desirable lightweightness can also be achieved by forming the spool on the side not easily visible externally from a low-cost synthetic resin.

With the sounding mechanism of the present invention, if both members rotate relative to one another, the clicking sound is produced by the repetitive collision of the sound producing pin, urged by the urging member, with the sound producing recesses. At this point, the length of the guide portion of the sound producing pin that extends into the mounting hole part does not fluctuate because, the guide portion of the sound producing pin is within the mounting hole.

In this case, since an appropriate gap is ensured between the sound producing pin and the mounting hole part, the sound producing pin moves easily, the attitude of the sound producing pin is maintained fixed during vibration and does not easily deviate, and the sound volume and quality is stable.

DETAILED DESCRIPTION OF THE PREFERRED EMBODIMENTS

FIRST EMBODIMENT

Overall Construction

Figure 1:
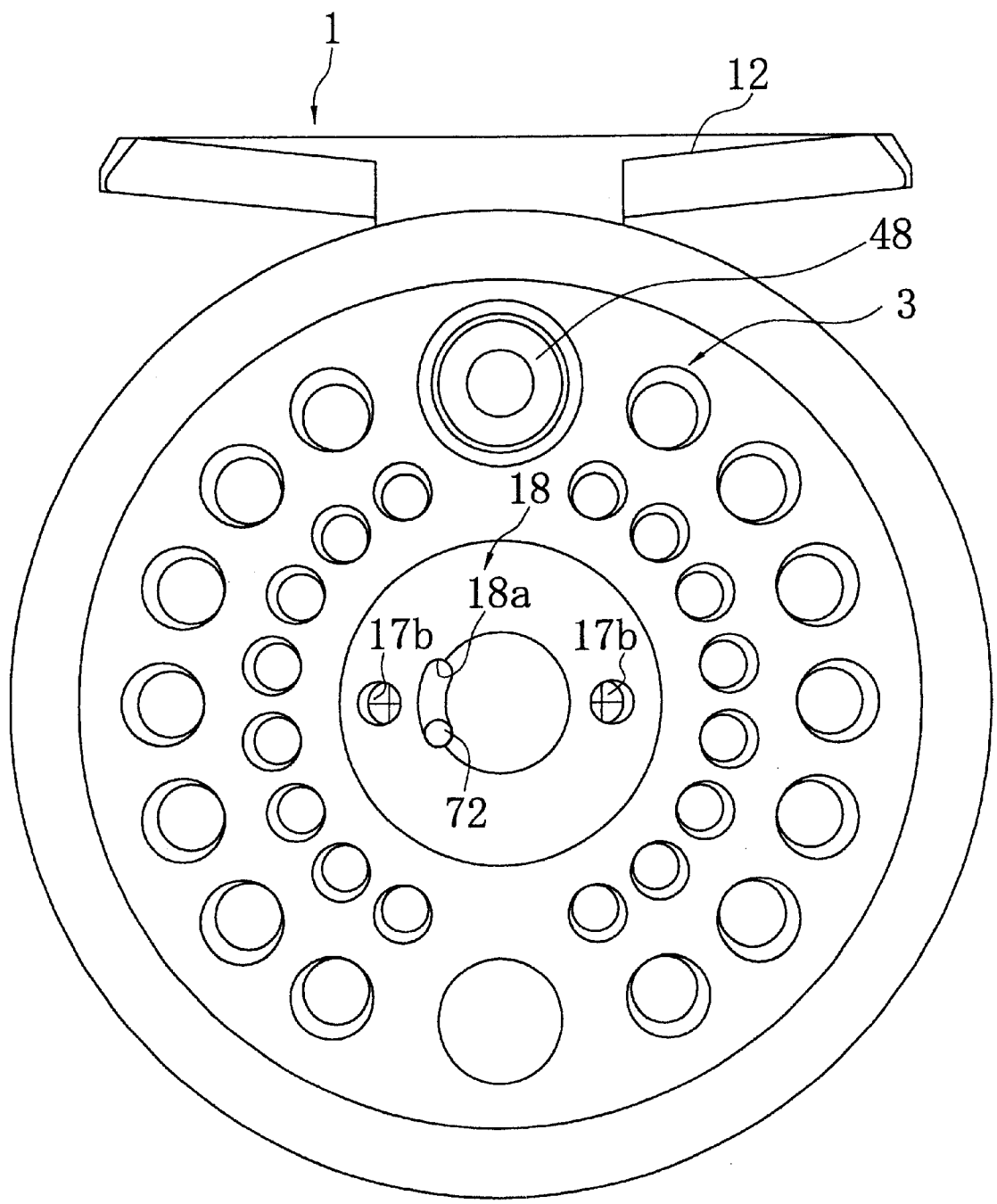
FIG. 1 is a side view of a single bearing reel according to a first embodiment of the present invention.
Figure 2:
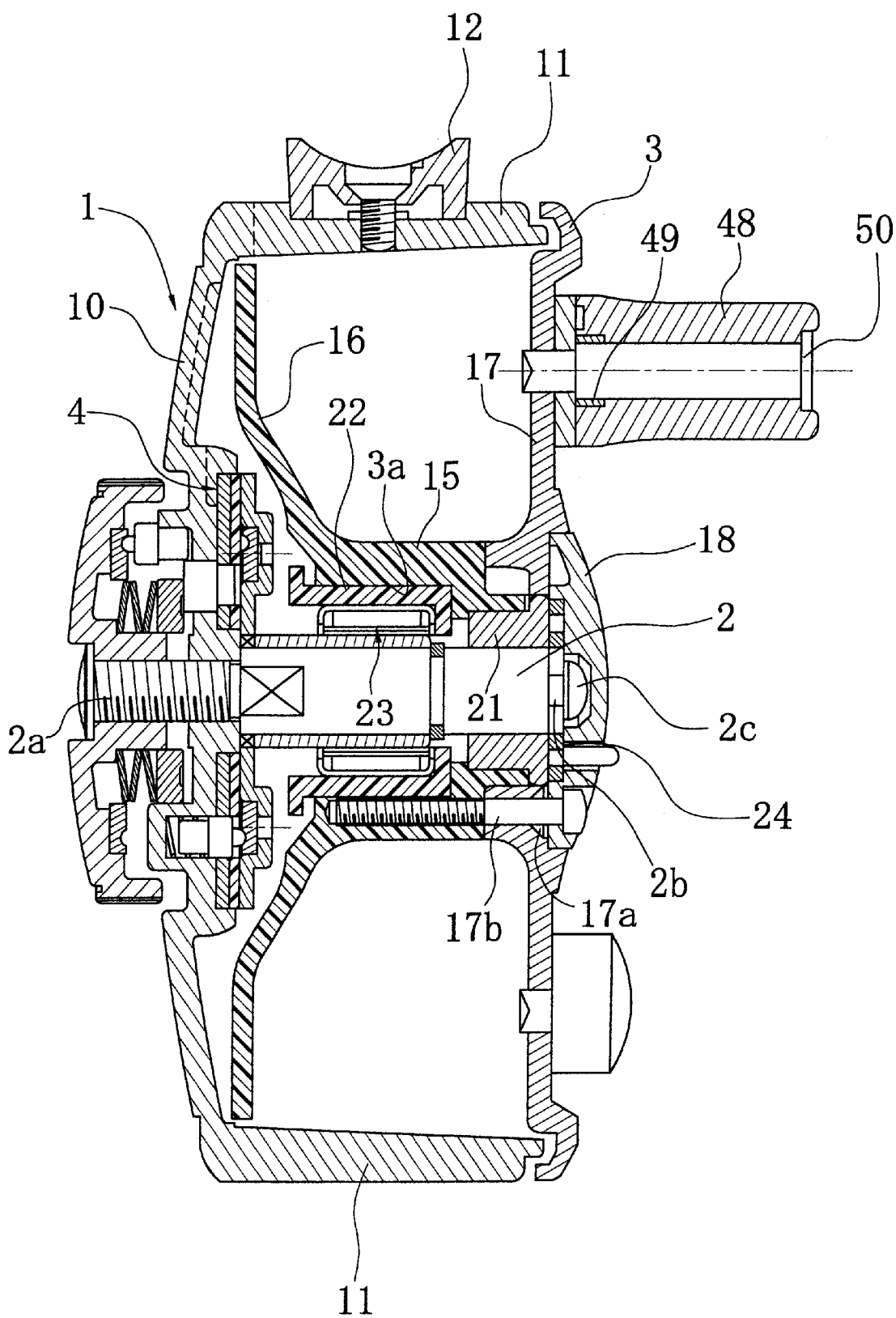
FIG. 2 is a cross-sectional view of the single bearing reel depicted in FIG. 1.

FIG. 1 and FIG. 2 show a single bearing reel according to a first embodiment of the present invention. In FIG. 1 and FIG. 2, the single bearing reel is provided with reel body 1; spool shaft 2 supported within the reel body 1; spool 3 rotatably arranged relative to spool shaft 2 and whereon fishing line is wound around the outer circumference of the spool 3; and drag mechanism 4 that brakes the rotation of the spool 3 in one direction of rotation of the spool 3.

Reel body 1 has disk-shaped side plate 10 on one side (left side of FIG. 2), and is open on a n opposite side thereof. A pair of cover portions 11 (upper and lower) extends in an axial direction from outer peripheral edges of the side plate 10. Although not shown, each of the cover portions 11 extends in a circumferential direction covering at least a portion of the spool 3 leaving at least one open space therebetween for a fishing line to extend out of. The upper side cover portion 11 is provided with mounting portion 12 for attaching the single bearing reel to a fishing rod (not shown).

Figure 3:
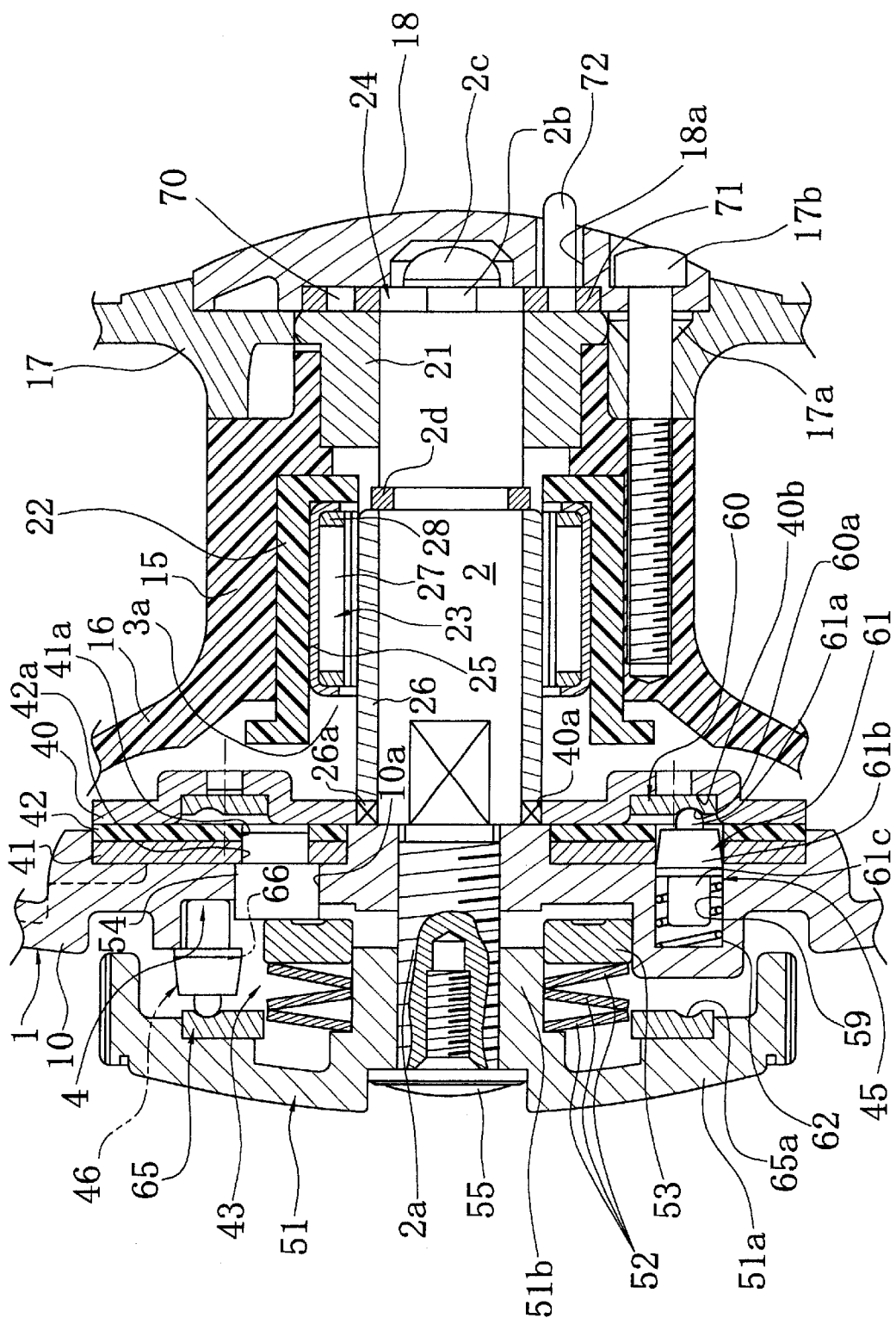
FIG. 3 is a cross-sectional view of a central portion of the single bearing reel depicted in FIGS. 1 and 2, on an enlarged scale.

Spool shaft 2 is affixed by screwing one end thereof to the center of side plate 10 of reel body 1, as shown in FIGS. 2 and 3. On the base end of spool shaft 2 a male screw 2a is provided that screws into reel body 1. Male screw 2a protrudes outward from the center of side plate 10 of reel body 1. In addition, a neck 2b and spherical head 2c are formed on the tip of spool shaft 2. The spherical head 2c has a diameter larger than the neck 2b. The tip of the head 2c is tapered, as shown in FIG. 3.

Figure 9:
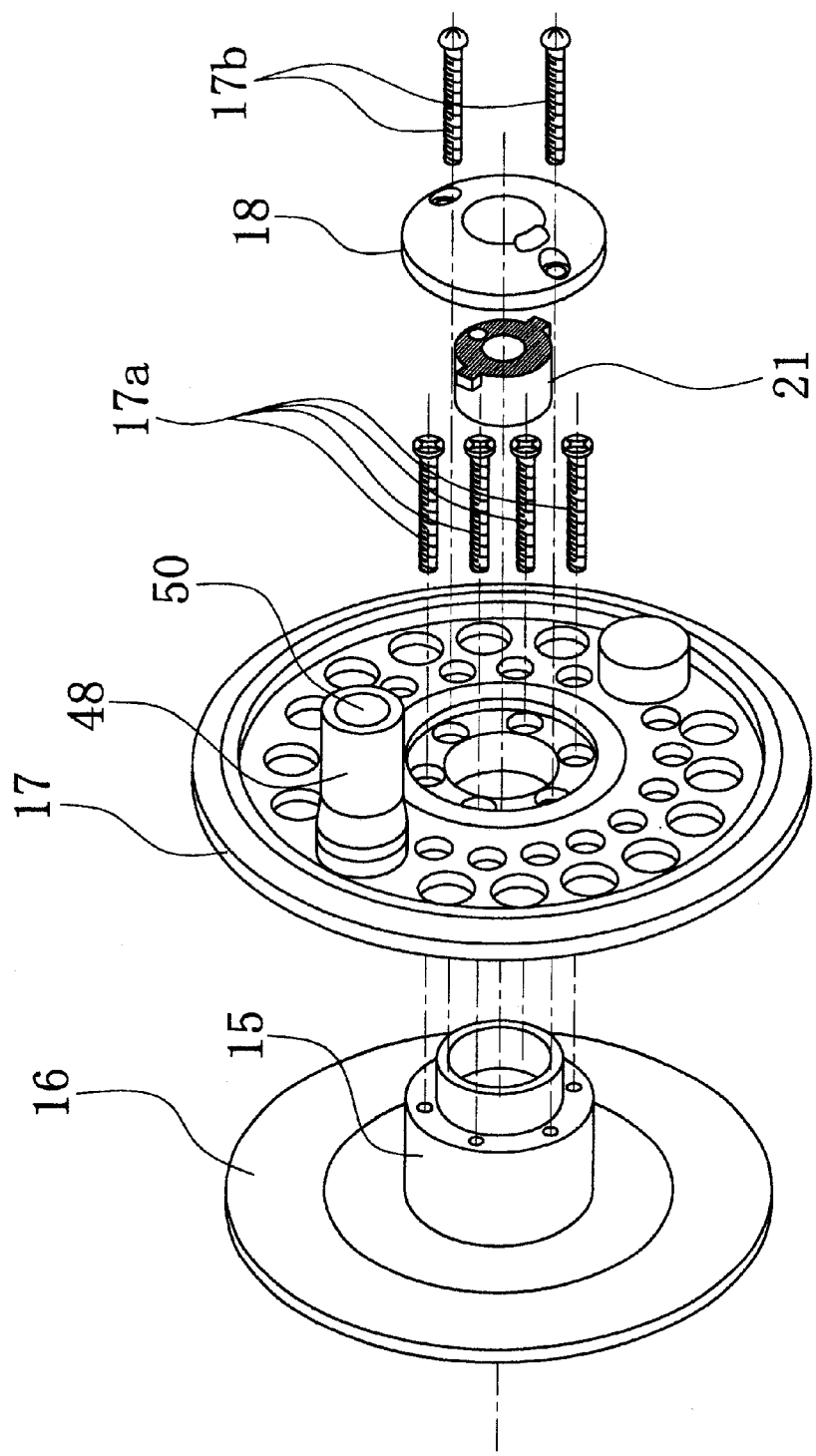
FIG. 9 is an exploded perspective view showing various portions of a spool of the single bearing reel.

The spool 3 includes a cylindrical drum 15 having a concentric internal space 3a; disk-shaped inner flange 16 formed unitarily on a first end of the drum 15; and an outer flange 17 mounted by bolts 17a (shown in FIG. 9) to a second end of the drum 15 so that the open portion of reel body 1 is covered.

Inner flange 16 is formed so that it opposes side plate 10 of reel body 1. The tip side of spool shaft 2 inside internal space 3a is closed by end face member 18. End face member 18 is mounted to spool 3 by bolts 17b that connect to the drum 15 and the outer flange 17. The outside surface of end face member 18 has a center portion that bulges slightly outward (in an axial direction relative to the spool shaft 2), and is continuously connected with a slight difference in axial height to the outside surface of flat outer flange 17, and with a gentle slope from the center toward an outer circumference thereof. Handle 48 is mounted on an outer surface of outer flange 17 adjacent to an outer circumferential periphery thereof. A handle shaft extends out of the outer surface of the outer flange 17, as shown in FIG. 2 and the handle 48 is rotatably supported about the handle shaft 50 via a bearing 49. Rotary operation of the spool 3 is facilitated by grasping handle 48.

The spool drum 15 and inner flange 16 are formed unitarily as a single member from synthetic resin, and the outer flange 17 is formed by press forming an aluminum alloy, for example.

As shown in detail in FIG. 2, inside of the internal space 3a of spool 3 are provided the following: a sliding bearing 21 that rotatably supports spool 3 so that it rotates about spool shaft 2; a roller clutch 23 that is connected when spool 3 is rotating in the fishing line unreeling direction; and engaging and disengaging mechanism 24 for removably engaging the spool 3 to spool shaft 2. In addition, drag mechanism 4 is provided at one end of spool shaft 2 on side plate 10, as is described further below.

Sliding bearing 21 is mounted on spool shaft 2 and extends over an end portion of drum 15. The sliding bearing is disposed concentrically at the center of outer flange 17, and rotates as one body with outer flange 17.

The roller clutch 23 is mounted on spool 3 within clutch holder 22, and is provided so that drag mechanism 4 operates only when the spool rotates in the line unreeling direction. As shown in FIG. 3, roller clutch 23 is an inner race spinning type construction having, for example, six rollers 27 arranged within the outer race 25 and between the outer race 25 and inner race 26. The outer race 25 is non-rotatably mounted to the surface of the clutch holder 22, and the clutch holder 22 in non-rotatable with respect to the internal space 3a of spool 3. The inner race 26 is rotatably mounted to spool shaft 2. The roller clutch 23 is, in effect, a one-way clutch that couples the spool 3 to the drag mechanism 4 only when fishing line is being cast out from the spool 3. The clutch holder 22 is made of a synthetic resin elastic such as polyacetal, for example. rotable with respect to the internal space 3a of spool 3. The inner race 26 is non-rotatably mounted to spool shaft 2. The roller clutch 23 is, in effect, a one-way clutch that couples the spool 3 to the drag mechanism 4 only when fishing line is being cast out from the spool 3. The clutch holder 22 is made of a synthetic resin elastic such as polyacetal, for example.

The outer race 25 is a cylindrical member made of metal wherein both ends are bent radially inward, and is non-rotatably coupled to the spool 3. The inner race 26 is a cylindrical member made of metal, longer than the outer race 25 in an axial direction, and extends in the axial direction toward the side plate 10. At the protruding end of inner race 26 a pair of engaging protrusions 26a is formed that protrude in the axial direction. The engaging protrusions 26a are provided to non-rotatably connect the drag mechanism 4 to the inner race 26. The movement of inner race 26 in the axial direction is restricted by locking ring 2d fitted on spool shaft 2 and by a surface of side plate 10 of reel body 1.

Between both the races 25 and 26 is mounted a retainer 28 made of synthetic resin for holding rollers 27 spaced apart in the circumferential direction. In retainer 28 is formed a retainer space (not shown) for movably retaining rollers 27 so that they are movable for a predetermined distance in the circumferential direction. On one side in the circumferential direction of the retainer space is formed as one body a spring member (not shown) for urging in the line unreeling direction (direction in which rollers 27 engage the races 25 and 26).

Drag Mechanism 4

As shown in FIG. 3, drag mechanism 4 includes: a rotary disk 40 non-rotatably engaged with the inner race; braking disk 42 that contacts a pressing disk 41 that is non-rotatably and movably mounted to the reel body 1 so that it is movable in the axial direction along spool shaft 2 and the rotary disk 40 when under pressure; and a pressure contact mechanism 43 for selectively adjusting pressing force on the braking disk 42. The braking disk 42 is retained in the reel body 1 such that it is moveable in the axial direction for contact with an adjacent annular surface of the rotary disk 40. Between rotary disk 40 and reel body 1 there is a first sounding mechanism 45 that sounds in response to relative rotation between the disk 40 and the reel body 1, namely during drag operations when a fishing line is being case out from the spool 3. In addition, pressure contact mechanism 43 is provided with a second sounding mechanism 46 that sounds when adjusting the drag force.

The rotary disk 40 is a member made of a metal such as, for example, stainless steel and has a pair of engaging grooves 40a on the inner circumference portion engaged to engaging protrusions 26a of inner race 26. In addition, ring-shaped recesses 40b is formed in the intermediate portion of rotary disk 40 in the radial direction. The first sounding mechanism 45 includes a ring-shaped first sounding member 60 that is non-rotatably affixed within recesses 40b to the rotary disk 40.

Pressing disk 41 is a member made of a metal such as, for example, stainless steel, that is formed with three equally circumferentially spaced apart round holes 41a. The braking disk 42 is made of, for example, a fiber-reinforced resin in which a carbon fiber is impregnated with a thermosetting resin, wherein, for example, three round holes 42a arranged equally spaced apart in the circumferential direction are formed at the intermediate portion in the radial direction. The braking disk 42 and pressing disk 41 are positioned such that the round holes 41a and 42a are aligned with one another, as shown in FIG. 3. It should be understood that the pressing disk 41 may also be made of other metal materials besides stainless steel. Further, the braking disk 42 may be made of any of a variety of materials, such as Nylon 66.

Pressure contact mechanism 43 has operation knob 51, three disk springs 52 pressed by operation knob 51, washer 53 pressed by the disk springs, and three pressing pins 54 (only one shown in FIG. 3), for example, pressed by washer 53.

Operation knob 51 has rimmed pan-shaped knob 51a, and boss 51b formed as one body with the knob 51a at the center thereof. The second sounding member 65 is non-rotatably affixed by, for instance, screws to the rear surface of the intermediate portion of knob 51a in the radial direction. Boss 51b is screwed onto male screw 2a formed at the tip of spool shaft 2. Operation knob 51 is prevented from slipping off by slip-off prevention bolt 55 mounted on the base end surface of spool shaft 2.

Three disk springs 52 (conical springs) are mounted in a row in the axial direction on the outer circumference side of boss 51b, and are provided for finely adjusting the drag force by the rotation of operation knob 51. A washer 53 is provided for transmitting the urging force of the disk springs 52 to pressing pins 54. The pressing pins 54 are circumferentially space apart pins (although only one is shown in FIG. 3). Tip sides of each pressing pin 54 has a small diameter portion and a large diameter portion. The small diameter portion of each pressing pin 54 extends into the holes 41a and 42a and the large diameter portions of each pressing pin 54 is retained within the through holes 10a formed at three locations in side plate 10 equally spaced apart in the circumferential direction. The large diameter portion of each pressing pin 54 may move in the axial direction within the holes 10a. Stepped portions between the large and small diameter portions of the pressing pins 54 contact the pressing disk 41 and thereby, the pressing disk 41 is pushed by pressing pins 54 toward the rotary disk 40. The drag force can be adjusted by changing the frictional force between braking disk 42 and rotary disk 40 by adjusting the spring force of disk springs 52 via rotational operation of operation knob 51.

Engaging and Disengaging Mechanism 24

The engaging and disengaging mechanism 24 includes locking member 71 that has a first end supported by a support pin 70. The locking member 71 is an L-shaped plate (not completely shown) that has a protruding knob 72 affixed to a second end of the locking member 71. The support pin 70 extends from the inner surface of end face member 18. The locking member 71 is configured to selectively engage the neck 2b formed on the end of spool shaft 2.

The locking member 71 is urged into engagement with the neck 2b by a return spring (not shown). As shown in FIG. 1, movable knob 72 passes through the arcuate shaped hole 18a that extends through the end face member 18 of spool 3. By contacting the knob 72 it is possible to move the locking member 71 out of engagement with the neck 2b, thereby freeing the spool 3 for removal from the spool shaft 2.

The knob 72 and locking member 71 cover and block the inner side of hole 18a forming a shield surface. The provision of this type of shield surface prevents the contamination of water, dust and dirt, and other foreign matter from entering the internal spacing 3a from the outside the hole 18a.

Sounding Mechanisms 45 and 46

Figure 4:
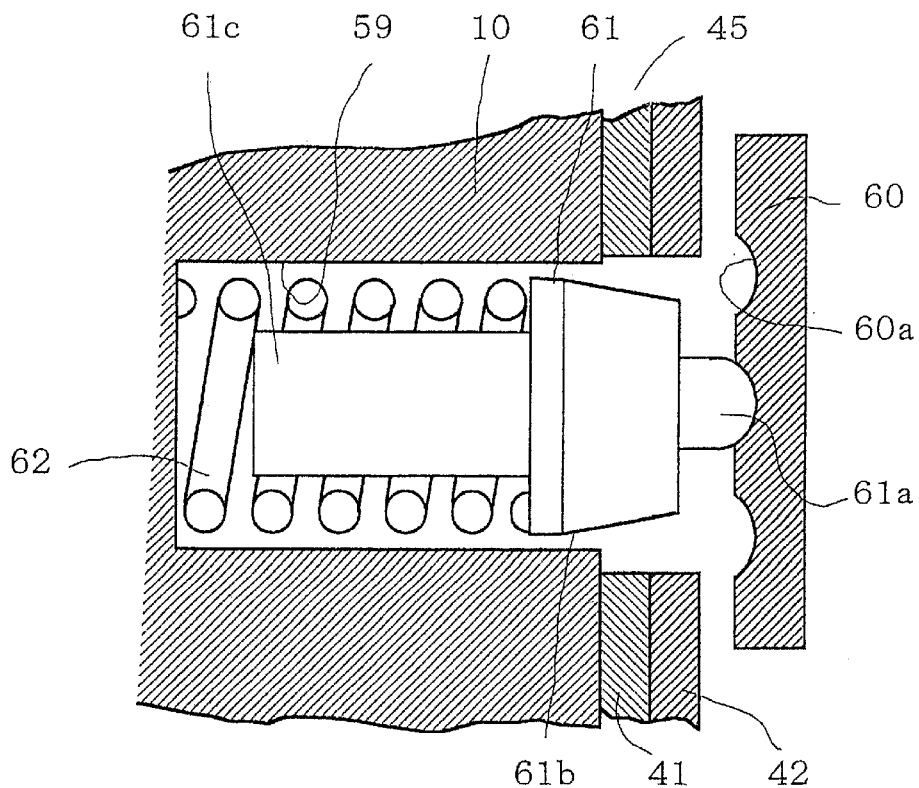
FIG. 4 is a cross-sectional view of a first sounding member shown with a side plate and a rotational member of the single reel bearing positioned close to one another.

First sounding mechanism 45 sounds when the drag mechanism operates. Specifically, when the rotary disk 40 rotates relative to the reel body 1 and side plate 10, the first sounding mechanism 45 makes noise. As shown in FIG. 4, first sounding mechanism 45 includes: the first sounding member 60 having first sounding recesses 60a; first mounting hole 59 formed on the inner surface of side plate 10; first sound producing pin 61 reciprocally movable within the first mounting hole 59; and first coil spring 62 that urges first sound producing pin 61 toward first sounding recesses 60a.

First sounding member 60 is a ring-shaped member affixed to rotary disk 40, as mentioned previously. A plurality of first sounding recesses 60a are numerously formed at spaced apart in the rotational direction on the side surface of first sounding member 60 facing the first sound producing pin 61.

First mounting hole 59 is a cylindrical hole provided at a position opposing at least one of the plurality of first sounding recesses 60a of side plate 10.

First sound producing pin 61 is moveably mounted in the axial direction in first mounting hole 59. First sound producing pin 61 includes: a head 61a that collides with the first sounding recesses 60a; a guide 61b connected to the head 61a and formed with a diameter larger than the head 61a; and shaft 61c connected to guide 61b and formed with a diameter smaller than guide 61b.

Figure 6:
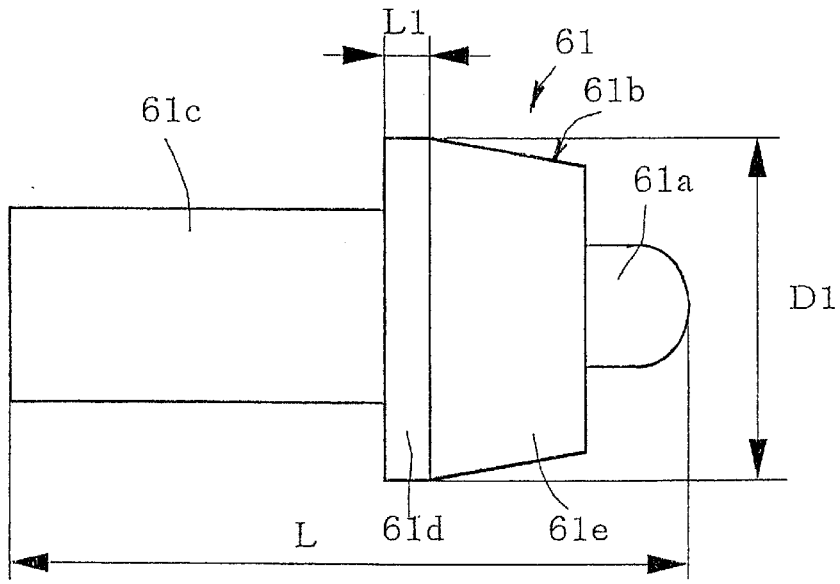
FIG. 6 is a side view of the sound producing pin shown removed from the single bearing reel.

As shown in FIG. 6, head 61a has a smooth, semispherical tip, and repeatedly collides with first sounding recesses 60a of first sounding member 60 during the drag operation to produce a delicate clicking sound.

Figure 5:
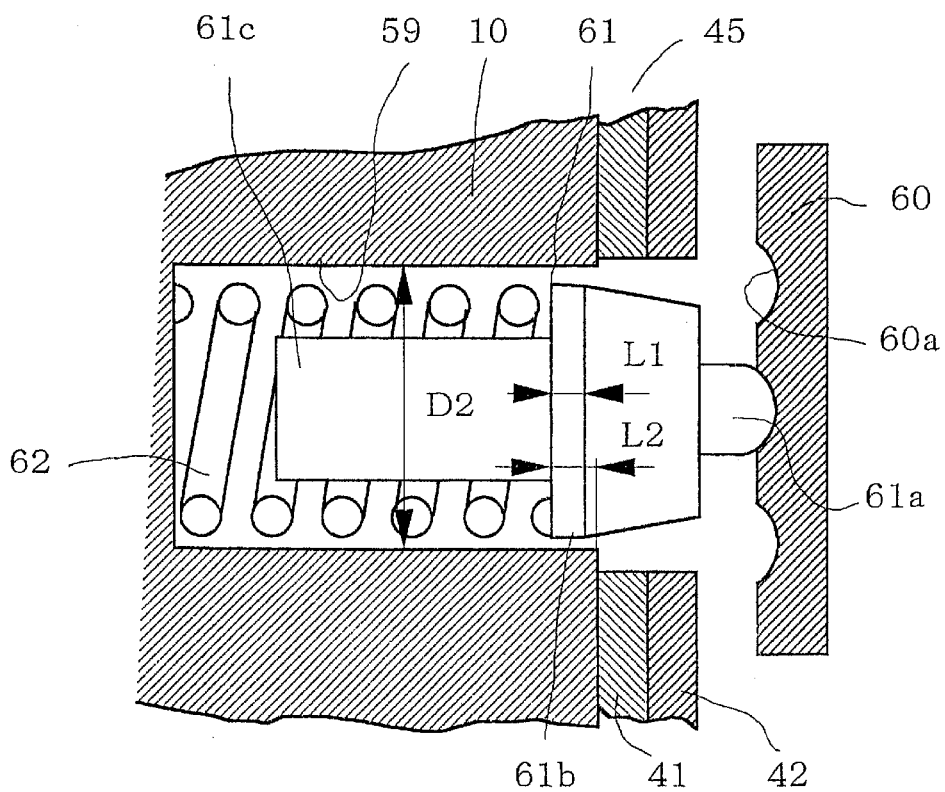
FIG. 5 is a cross-sectional view of the first sounding member similar to FIG. 4, with the side plate and the rotational member adjusted with a separation gap therebetween that is larger than the gap depicted in FIG. 4.

Guide 61b has: cylindrical portion 61d guided in first mounting hole 59; and tapered portion 61e formed with a taper from the cylindrical portion 61d to the head 61a. When the head 61a of the first sound producing pin 61 contacts the first sounding recesses 60a in a state wherein the side plate 10 and the first sounding member 60 (rotary disk 40) are most separated, as shown in FIG. 5, axial length L1 of the guided portion (cylindrical portion 61d (shown in FIG. 6) of guide 61b that is guided in first mounting hole 59 is shorter than overlapping length L2 of the portion wherein first sound producing pin 61 and first mounting hole 59 overlap on the head 61a side of guide 61b. In addition, length L1 of the cylindrical portion 61d is between 5% and 20% of the total length L of the first sound producing pin 61. The maximum outer diameter of the guide 61b, namely diameter D1 of the cylindrical portion 61d, is in a range of 85% to 98% of the inner diameter D2 (FIG. 5) of the first mounting hole 59.

The shaft 61c is a shaft-shaped portion with a diameter smaller than guide 61b so that first coil spring 62 can be arranged on the outer circumference thereof. The tip of first coil spring 62 makes contact at the stepped portion between guide 61b and shaft 61c.

The first coil spring 62 is arranged on the outer circumference side of the shaft portion 61c, and is contained in the first mounting hole 59 in a compressed state wherein the tip makes contact at a stepped portion between guide 61b and shaft portion 61c of the first sound producing pin 61.

Furthermore, axial length L1 of the cylindrical portion 61d, which is guided in the first mounting hole 59 of the guide 61b of the first sound producing pin 61, is shorter than overlap length L2, in the state wherein side plate 10 and first sounding member 60 (rotary disk 40) are most separated, because with the length L1, L2 set as described above, the length of the guided portion is the length of the cylindrical portion 61d and becomes fixed, no matter how the spacing between the side plate 10 and the first sounding member 60 fluctuates. Consequently, the ease with which the first sound producing pin 61 moves does not fluctuate easily even if the spacing between the side plate 10 and the first sounding member 60 fluctuates, and variation in the quality and volume of the clicking sound can thereby be controlled.

In addition, since the length of the guided portion is maintained shorter than the total length of the first sound producing pin 61 if length L1 of cylindrical portion 61d is set between 5% to 20% of the total length of the first sound producing pin 61, the first sound producing pin 61 inclines easily to an appropriate degree in the rotational direction when the first sounding member 60 rotates, and a large volume is easy to obtain.

Furthermore, since a gap of an appropriate degree is ensured between the first sound producing pin 61 and the first mounting hole 59 if the maximum outer diameter of guide 61b, namely diameter D1 of cylindrical portion 61d, is set to a range of 85% to 98% of inner diameter D2 (FIG. 5) of the first mounting hole 59, the first sound producing pin 61 is easy to move, the attitude of the first sound producing pin 61 during vibration is maintained fixed and does not deviate easily, and the volume and quality of sound thereby stabilizes.

As shown in FIG. 3, the second sounding mechanism 46 has approximately the same construction as the first sounding mechanism 45, and sounds if operation the knob 51 rotates with respect to the reel body 1 (side plate 10). The second sounding mechanism 46 has: a second sounding member 65; a second mounting hole (not shown); a second sound producing pin 66; and a second coil spring (not shown). The second sounding member 65 is a ring-shaped member affixed to the rear surface of the operation knob 51, and a plurality of second sounding recesses 65a are formed on the surface opposing side plate 10 spaced apart in the rotational direction. The second mounting hole is formed on the outer surface of the side plate 10 in a shape the same as that of the first mounting hole 59. The second sound producing pin 66 is a pin having a guide with a shape the same as that of the first sound producing pin 61. The second sounding mechanism 46 produces a delicate clicking sound if operation knob 51 rotates. Since operation knob 51 also screws into spool shaft 2, the spacing with respect to side plate 10 varies due to the rotation. However, since the guided length of second sound producing pin 66 is shorter than the overlapping length, the quality and volume of sound do not easily fluctuate even if the spacing varies.

Operation of the Reel

The following explains the operation.

Although not shown, fishing line is wound on the outer circumference of the drum 15 of the spool 3. When winding the fishing line, the handle 48 is operated to the rotate spool 3. The spool 3 rotates relative to the spool shaft 2. At this point, since the roller clutch 23 is disconnected, the outer race 25 rotates freely and rotation in the direction of winding of the spool 3 is permitted. Consequently, the spool 3 rotates smoothly.

When unreeling fishing line from the spool 3, the spool 3 rotates in a direction reverse from that mentioned above. At this point, since the roller clutch 23 is connected, both the inner race 26 and the outer race 25 attempt to rotate together. However, since the inner race 26 is braked by the braking disk 42 via the rotary disk 40, the resistive force (drag force) determined by the disk springs 52 acts against the rotary force, and the drag operation state is entered. Consequently, the excessive pulling out of fishing line due to the excessive rotation of the spool 3 can be prevented, and line entanglement can be avoided.

In addition, since both the rotary disk 40 and the spool 3 rotate together and the pressing disk 41 and the braking disk 42 are prohibited from such rotation during such unreeling of fishing line, the rotary disk 40 and the braking disk 42 rotate relative to one another. If the rotary disk 40 rotates, the first sounding member 60 also rotates, the head 61a of the first sound producing pin 61 repeatedly collides with the first sounding recesses 60a, and a sound is generated between the head 61a and the first sounding member 60. At this point, the first sound producing pin 61 vibrates by repeatedly moving back and forth in the axial direction while inclining in the rotational direction. During this vibration, axial length L1 of the cylindrical portion 61d, namely the length of the guided portion of the first sound producing pin 61, does not fluctuate even if the spacing between the rotary disk 40 and the braking disk 42 fluctuates between the positions shown in FIGS. 4 and 5 due to the adjustment of the drag force by the operation knob 51. Consequently, the volume and quality of sound of first sounding mechanism 45 does not fluctuate easily even if the adjustment state of the drag force differs.

The spool 3 of the present invention is removable from the reel body 1 and spool shaft 2. In order to remove the spool 3, the knob 72 operates in opposition to the urging force of return spring (not shown), and disengages the locking member 71 from neck part 2b of spool shaft 2. With removable knob 72 maintained in a disengaging position, the spool 3 may pulled off of the spool shaft 2 with the roller clutch 23 remaining on the spool shaft.

With the spool 3 removed from the spool shaft 2, the spooling direction can be changed to the reverse direction by changing the orientation of roller clutch 23 (a one-way clutch). In this case, clutch holder 22 is first pulled off of spool 3. After clutch holder 22 is pulled off, roller clutch 23 is extracted from clutch holder 22. To reverse the orientation of roller clutch 23, the roller clutch 23 is pulled off of the inner race 26 and inserted in a reverse orientation (rotating it 180°) and reinstalled on the spool shaft 2 with the spool 3.

To reinstall the spool 3 on the spool shaft 2, the spool 3 is placed on the spool shaft 2, the knob 72 is pushed to move the locking member 71 into a disengaging position allowing the neck 2b to move into position. Thereafter, the knob 72 is urged by the spring (not shown) into engagement with the neck 2b, and spool 3 is mounted to spool shaft 2.

In the above described single bearing reel, the spool 3 includes a spool drum 15, an inner flange 16 formed as a single body from synthetic resin, and outer flange 17 made of an aluminum alloy. Furthermore, since the spool drum 15 and inner flange 16 can be formed as a body separate from the outer flange 17, they can be formed more easily than forming them as a single body with spool 3.

In addition, since spool 3 can be formed from different materials, the aesthetic appearance can be improved by making outer flange 17, which is visible externally, of a metal having a high-grade feel, and fabrication work like drilling holes in the surface is made easier. On the other hand, lightweight can be achieved by forming the spool drum 15 and inner flange 16 from a low-cost synthetic resin.

Figure 7:
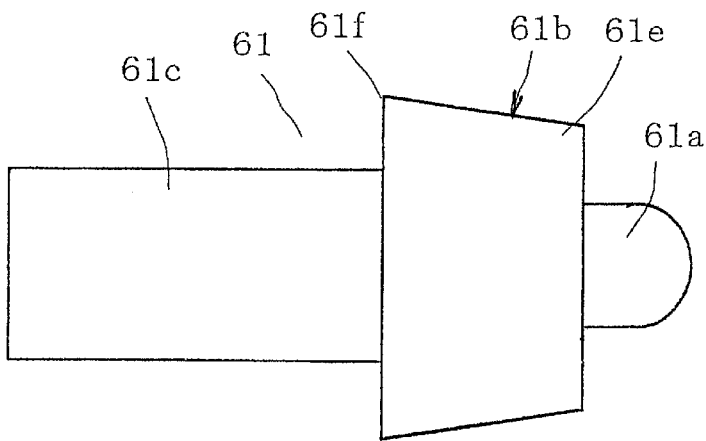
FIG. 7 is a side view similar to FIG. 6, showing an alternate embodiment of the sound producing pin.
Figure 8:
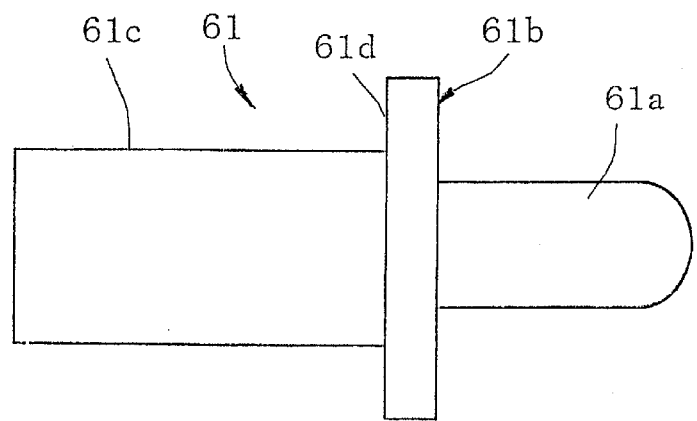
FIG. 8 is a side view similar to FIGS. 6 and 7, showing yet another embodiment of the sound producing pin.

Alternate Embodiments (a) In the abovementioned embodiment of the present invention, the guide 61b includes the cylindrical portion 61d and the tapered portion 61e. However, as shown in FIG. 7, the guide 61b may be formed with just a tapered portion 61e and, as shown in FIG. 8, may be formed only with the cylindrical portion 61d. If the guide only includes the tapered portion 61e, as shown in FIG. 7, the guided portion 61e includes an end rim 61f on the shaft portion 61c side of tapered portion 61e. Consequently, the guided portion contacts first mounting hole 59 at a circular line instead of a cylindrical surface, and first sound producing pin 61 easily inclines. In addition, if the guide portion only includes the cylindrical portion 61d, as shown in FIG. 8, the length of head 61a becomes longer than the one that has tapered portion 61e. In addition, since the shape is simplified, manufacturing is made easier.

(b) In the above described embodiment of the present invention, a coil spring was used as the urging member; however, the urging member is not limited to a coil spring and may be of another type, for instance, a leaf spring or disk spring.

(c) The abovementioned mode for carrying out the present invention was explained using an example of a single bearing reel as the fishing reel; however, the fishing reel wherein the sounding mechanism of the present invention is applied is not limited to a single bearing reel, and can also be applied to other fishing reels like dual bearing reels and spinning reels.

(d) In the above described embodiment of the present invention, the spool drum 15 and the inner flange 16 is made of synthetic resin and outer flange 17 is made of metal; however, for example, the spool drum 15 and the inner flange 16 may also be made of an aluminum alloy, and the outer flange 17 may be made of a metal of a different material like stainless steel.

(e) In the above described embodiment, members made of metal like the outer flange 17 were press formed; however, the present invention is not limited thereto. For example, these members may be formed using methods like die casting and forging.

(f) In the above described embodiment, the outer flange 17 was affixed to spool drum part 15 by bolts 17a, 17b; however, the present invention is not limited thereto. For example, it may be affixed by a coupling method like bayonet coupling.

(g) In the above described embodiment, inner flange 16 is formed as a single body with spool drum 15; however, outer flange 17 may be formed as a single body with spool drum part 15.

Figure 10:
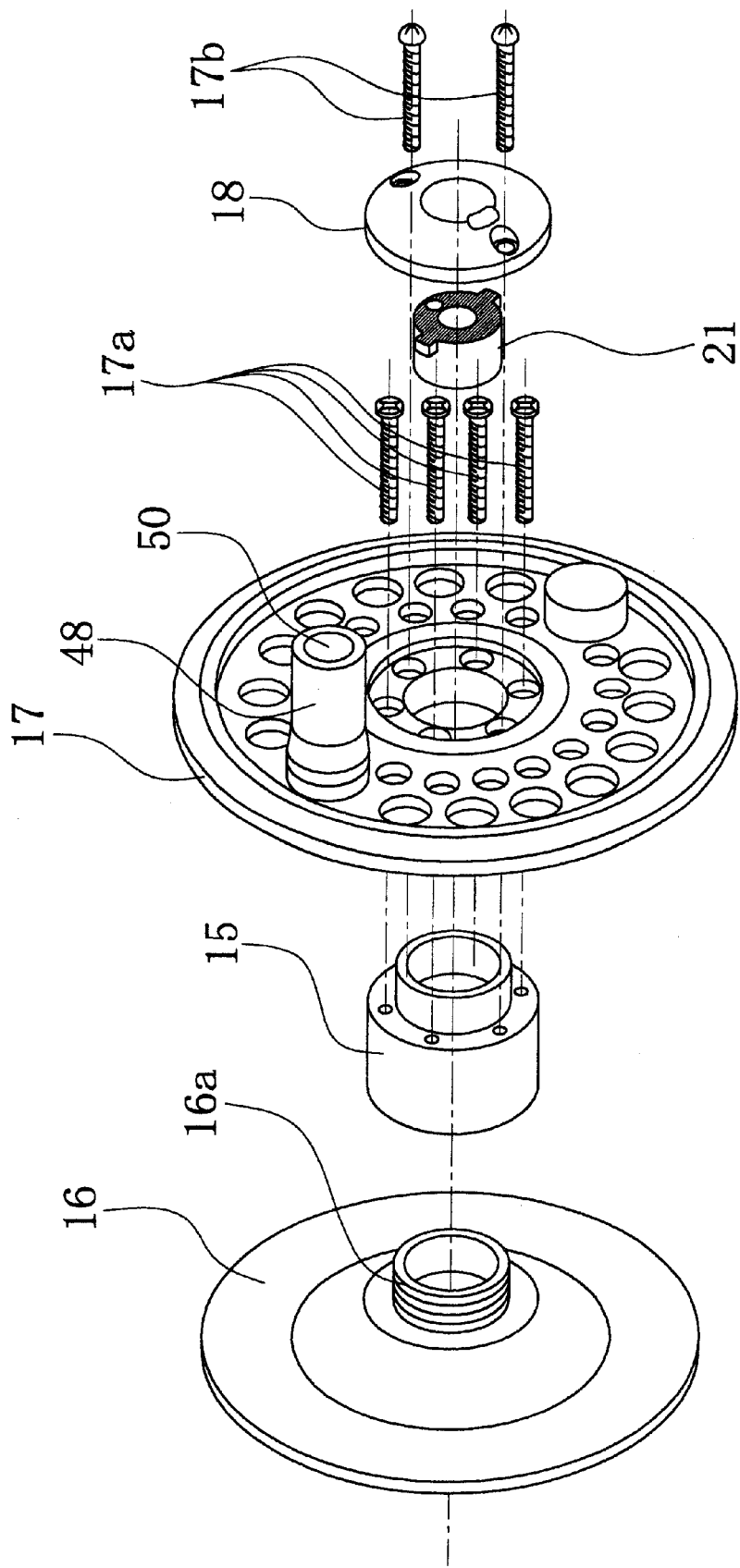
FIG. 10 is an exploded perspective view similar to FIG. 9, showing various portions of a spool of the single bearing reel in accordance with an alternate embodiment.
Figure 11:
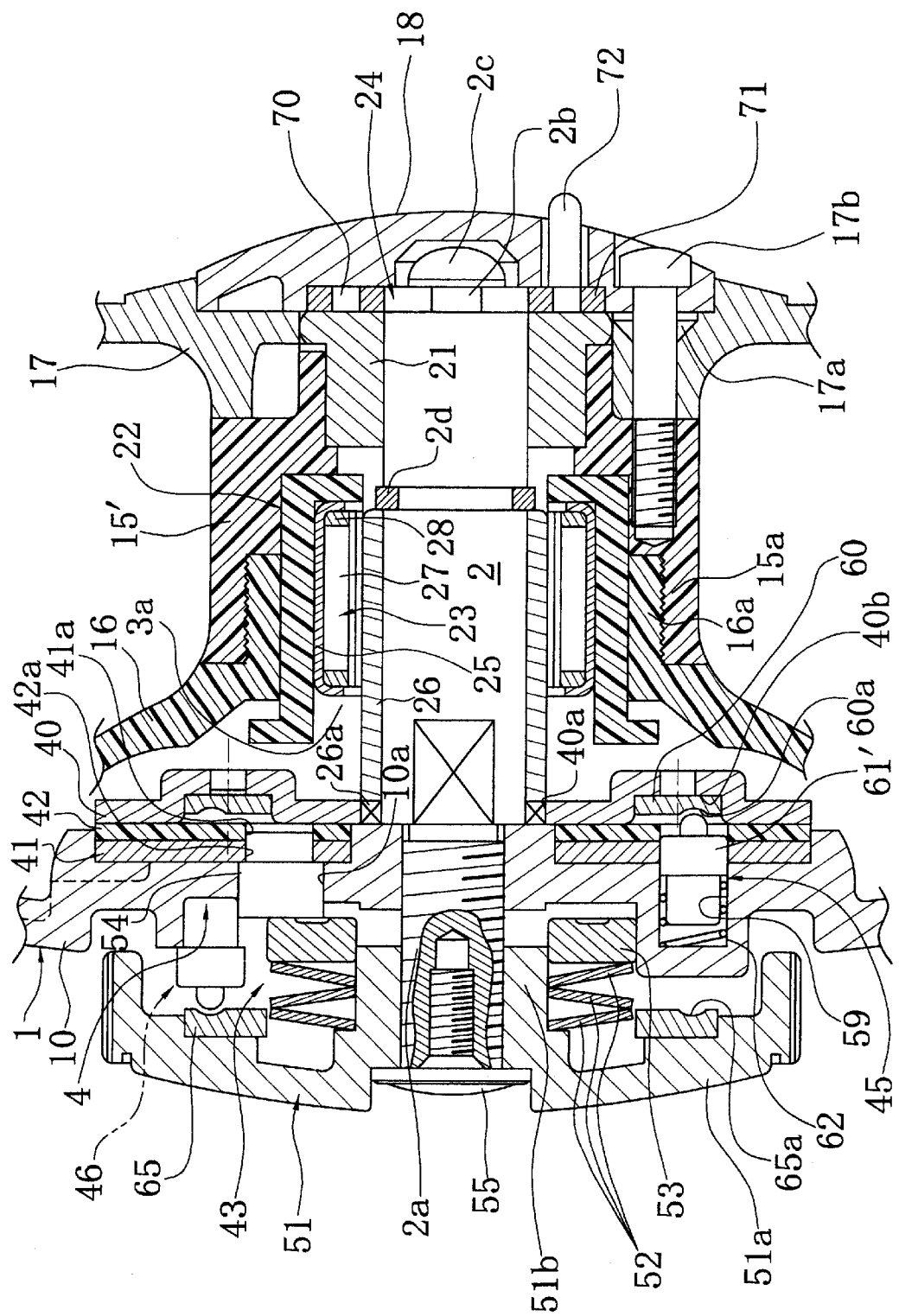
FIG. 11 is a cross-sectional view of a central portion of the single bearing reel depicted in FIG. 9.

(h) In the above described embodiment, the inner flange 16 is formed as a single body with spool drum 15. However, spool drum 15 and inner flange 16 may be formed as separate members, as is shown in FIGS. 10 and 11. As shown in FIGS. 10 and 11, the inner flange 16 is formed with a small hub having threads 16a. A separate spool drum 15' is formed with internal threads (shown in FIG. 11) that thread onto the threads 16a. The separate spool drum 15' is therefore removable from the inner flange 16. In this embodiment, the drum 15' and inner flange 16 may be made of, for instance, synthetic resin.

In the alternate embodiment depicted in FIGS. 10 and 11, a first sound producing pin 61' may be employed or the first sounding producing pin 61 (described above) may be used.

Effects of the Invention

According to the present invention, since the axial length of the guided portion of the guide of the sound producing pin that is guided in the mounting hole is shorter than the length of the portion wherein the sound producing pin and the mounting hole overlap, the length of the guided portion is fixed and the length of the guided portion of the sound producing pin in the mounting hole does not fluctuate no matter how the spacing between the first and second members fluctuates. Consequently, even if the spacing between the first and second members fluctuates, the ease with which the sound producing pin moves does not easily fluctuate, and variation in the quality and volume of the clicking sound can be controlled.

According to the present invention, it is possible to construct a spool from a plurality of members facilitating simplified manufacturing and more reliable structural integrity. In addition, since the spool is formed from different members, it is possible to use different materials for each member thereby providing a cost savings and yet the aesthetic appearance can be improved by, for example, making the external flange with a high-grade finish. In addition, a lightweight construction can be achieved by forming portions of a low-cost synthetic resin.

What is claimed is:

1. A single-bearing fishing reel comprising:

an open-sided reel body having a single side plate;

a spool shaft one end of which is disposed on the side plate concentrically therewith and supported at the other end on the single bearing defining the single-bearing reel;

an at least bipartite flanged spool having
  a line-carrying drum portion removably fitted onto said spool shaft,
  an inner flange configured on said drum portion endwise,
  an outer flange made of metal, being a different material from material from which either said drum portion or said inner flange is made, removably bolted centrally through its exterior face to said drum portion endwise opposite said inner flange by a plurality of bolts, said outer flange retaining the single bearing, supporting a spool-cranking handle and alone covering the open side of the reel body when said drum portion is fitted onto said spool shaft.

2. A single-bearing fishing reel as set forth in claim 1, further comprising a sounding mechanism disposed between said inner flange and a stationary portion of said reel body.

3. A single-bearing fishing reel as set forth in claim 2, wherein said sounding mechanism comprises:

a sound-producing pin supported within the stationary portion of said reel body;

an annular member disposed radially inward and endwise of said spool for contact with said sound-producing pin, and rotatively carried by means for said annular member to rotate together with said spool in one directional only; and means on said annular member for producing sound through contact with said sound producing pin when said annular member rotates.

4. A single-bearing fishing reel as set forth in claim 3, further comprising a drag mechanism disposed radially inward and endwise of said spool for unidirectionally braking its rotation, wherein said pin is disposed within said drag mechanism.

5. A single-bearing fishing reel as set forth in claim 1, wherein said inner flange is a separate component from, of the same material as, and thread-mated to, said drum portion.

6. A single-bearing fishing reel as set forth in claim 5, wherein said inner flange and said drum portion are made of a synthetic resin material.

7. A single-bearing fishing reel as set forth in claim 1, wherein said inner flange is a separate component from, of a different material than, and bolted to, said drum portion.

8. A single-bearing fishing reel as set forth in claim 7, wherein said inner flange is made of a synthetic resin material.

9. A single-bearing fishing reel as set forth in claim 1, further comprising an end face member attached exteriorly to and over the center of said outer flange, therein covering the plurality of bolts fastening said outer flange to said drum portion.

* * * * *